US009982120B2

(12) United States Patent
Nakajima et al.

(10) Patent No.: US 9,982,120 B2
(45) Date of Patent: May 29, 2018

(54) POLYPROPYLENE COMPOSITIONS

(71) Applicant: BASELL POLIOLEFINE ITALIA S.R.L.

(72) Inventors: Takeshi Nakajima, Kawasaki (JP); Kazuhiko Sakai, Kawasaki (JP); Minoru Kuriyama, Kawasaki (JP); Masanori Maruyama, Kawasaki (JP)

(73) Assignee: Basell Poliolefine Italia S.r.l., Milan (IT)

( * ) Notice: Subject to any disclaimer, the term of this patent is extended or adjusted under 35 U.S.C. 154(b) by 31 days.

(21) Appl. No.: 15/117,320

(22) PCT Filed: Feb. 4, 2015

(86) PCT No.: PCT/EP2015/052245
§ 371 (c)(1),
(2) Date: Aug. 8, 2016

(87) PCT Pub. No.: WO2015/117983
PCT Pub. Date: Aug. 13, 2015

(65) Prior Publication Data
US 2016/0347941 A1 Dec. 1, 2016

(30) Foreign Application Priority Data
Feb. 6, 2014 (EP) .................................. 14154145

(51) Int. Cl.
*C08L 23/12* (2006.01)
*C08F 210/06* (2006.01)
*C08J 5/18* (2006.01)
*C08L 23/10* (2006.01)
(Continued)

(52) U.S. Cl.
CPC ............ *C08L 23/12* (2013.01); *C08F 210/06* (2013.01); *C08J 5/18* (2013.01); *C08K 5/0083* (2013.01); *C08L 23/10* (2013.01); *C08L 23/16* (2013.01); *C08J 2323/10* (2013.01); *C08J 2323/12* (2013.01); *C08J 2423/08* (2013.01); *C08L 2203/16* (2013.01); *C08L 2203/30* (2013.01);
(Continued)

(58) Field of Classification Search
CPC ...................................................... C08L 23/12
See application file for complete search history.

(56) References Cited

U.S. PATENT DOCUMENTS

| 4,337,326 A | 6/1982 | Shiga et al. |
| 5,541,260 A * | 7/1996 | Pelliconi ............... C08F 297/08 525/240 |
| 7,531,594 B2 * | 5/2009 | Lin .......................... C08K 5/01 524/474 |

FOREIGN PATENT DOCUMENTS

| EP | 0603723 A1 | 6/1994 |
| EP | 2022824 A1 | 2/2009 |
| JP | S5655416 A | 5/1981 |

(Continued)

*Primary Examiner* — Arrie L Reuther

(57) ABSTRACT

The present disclosure relates to a heterophasic polypropylene compositions comprising 78-85% by weight of a propylene homopolymer or copolymer matrix with up to 2.0% by weight of ethylene units, 15-22% by weight of an elastomeric ethylene-propylene copolymer and a clarifying agent. The composition has an intrinsic viscosity of the xylene soluble fraction at room temperature of from 0.5 to 1.5 dl/g and a melt flow rate (230° C., 2.16 kg) of 0.5 to 10 g/10 min. The compositions of the present disclosure can be used to prepare sheets for thermoforming applications.

9 Claims, 1 Drawing Sheet

SAXS profile of Example 3

(51) Int. Cl.
*C08K 5/00* (2006.01)
*C08L 23/16* (2006.01)
(52) U.S. Cl.
CPC ....... *C08L 2205/02* (2013.01); *C08L 2207/02* (2013.01); *C08L 2314/02* (2013.01)

(56) References Cited

FOREIGN PATENT DOCUMENTS

| | | | |
|---|---|---|---|
| JP | S61252218 A | 11/1986 |
| JP | H07145220 A | 6/1995 |
| JP | H0987449 A | 3/1997 |
| JP | H0987451 A | 3/1997 |
| KR | 20100043722 A | 4/2010 |
| WO | WO-2004011507 A1 | 2/2004 |
| WO | WO-2011045194 A1 | 4/2011 |
| WO | WO-2013004804 A1 | 1/2013 |

* cited by examiner

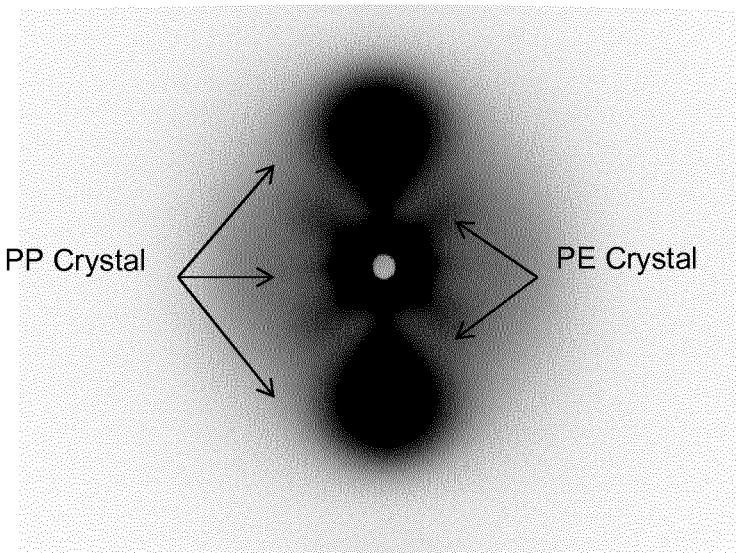
Figure 1. SAXS profile of Example 3
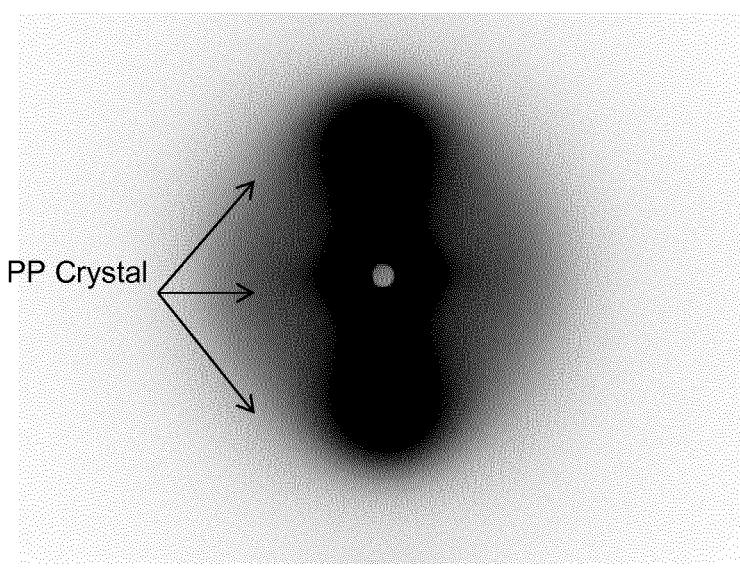
Figure 2. SAXS profile of Example 10C

POLYPROPYLENE COMPOSITIONS

This application is the U.S. National Phase of PCT International Application PCT/EP2015/052245, filed Feb. 4, 2015, claiming benefit of priority to European Patent Application No. 14154145.8, filed Feb. 6, 2014, the contents of which are incorporated herein by reference in its entirety.

The present disclosure relates to polypropylene compositions comprising a heterophasic propylene polymer and a nucleating agent. The disclosure also relates to sheets obtained therefrom and to thermoformed articles obtained from such sheets.

Impact resistance of polypropylene can be improved by the addition of an ethylene-based elastomeric copolymer, such as an ethylene-propylene copolymer, either by mechanical mixing or by sequential polymerization. Heterophasic compositions comprising a crystalline polypropylene matrix and a rubbery phase formed by an ethylene-based elastomeric copolymer are described, for instance, in European Patent Application Nos. 170255, 373660, 603723, 1135440, 2084223 and 2247424.

The disclosed compositions exhibit good impact resistance and, in certain cases, good optical properties. However, the overall balance of properties is still not satisfactory in the whole range of possible commercial applications.

Therefore, there remains a continuous demand for polypropylene compositions with improved properties that are balanced for specific target applications. An excellent balance of properties for applications such as the production of sheets for thermoforming applications, has now been achieved by the polypropylene compositions of the present disclosure.

In some embodiments, the present disclosure provides for a polypropylene composition comprising:
  (a) 78-85%, including 80-83%, by weight of a propylene homopolymer or a copolymer of propylene with ethylene having an ethylene content of up to 2.0% by weight;
  (b) 15-22%, such as 17-20%, by weight of a copolymer of ethylene with propylene having an ethylene content of from 78-90% by weight; and
  (c) an effective amount of a clarifying agent;
  wherein the composition has an intrinsic viscosity of the xylene soluble fraction (XSIV) at room temperature of from 0.5 to 1.5 dl/g and a melt flow rate (MFR), measured at 230° C. and 2.16 kg, of from 0.5 to 10 g/10 min.

The clarifying agent may be present in the composition of the present invention in amount of from 0.05 to 1% by weight, such as from 0.1 to 0.5% by weight and from 0.2 to 0.4% by weight, with respect to the total weight of the composition.

Clarifying agents for use in the composition according to the disclosure may include inorganic nucleating agents (such as pulverized clay, silicates, alkali salts, alkaline earth salts, aluminium salts, titanium salts, and metal oxides), organic nucleating agents (2-mercaptobenzimidazole, sorbitol derivatives, nonitol derivatives, and phosphate derivatives, for example), and 1,3,5-trisamide derivatives.

In some embodiments, clarifying agents are sorbitol derivatives, such as 1,3:2,4-bis-(3,4-dimethylbenzylidene) sorbitol, nonitol derivatives including 1,2,3-trideoxy-4,6:5,7-bis-O-[(4-propylphenyl)methylene]-nonitol, phosphate derivatives including 2,2'-methylenebis(2,4-di-tert-butyl-phenyl)phosphate lithium salt, and 1,3,5-trisamide derivatives.

Examples of clarifying agents include, but are not limited to, Millad® 3988 and Millad® NX8000 (commercially available from Milliken Chemicals), ADK NA-21 and ADK NA-71 (commercially available from Amfine Chemicals), and CGX386 (commercially available from Ciba). These crystal nucleating agents may be used alone or in combination.

The compositions of the present disclosure are endowed with a valuable combination of properties, including stiffness, impact resistance and transparency in terms of haze and whiteness indexing.

The compositions of the present disclosure can be prepared by a sequential polymerization, comprising at least two sequential steps, wherein components (a) and (b) are prepared in separate subsequent steps, operating in each step, except the first step, in the presence of the polymer formed and the catalyst used in the preceding step. In some embodiments, the catalyst is added only in the first step, however its activity is such that it is still active for all the subsequent steps. In certain embodiments, component (a) is prepared before component (b).

In some embodiments, the present disclosure is directed to a process for the preparation of the polyolefin compositions as reported above, wherein the process comprises at least two sequential polymerization stages, with each subsequent polymerization being conducted in the presence of the polymeric material formed in the immediately preceding polymerization reaction, and wherein the polymerization stage of propylene to the polymer component (a) is carried out in at least one stage, then at least one copolymerization stage of mixtures of ethylene with propylene to the elastomeric polymer component (b) is carried out. The polymerization stage may be carried out in the presence of a stereospecific Ziegler-Natta catalyst.

The polymerization stages may occur in liquid phase, in gas phase or in liquid-gas phase. In some embodiments, the polymerization of the polymer component (a) is carried out in a liquid monomer (e.g., using liquid propylene as diluent), while the copolymerization stages of the elastomeric copolymer component (b) is carried out in gas phase. Alternatively, all of the sequential polymerization stages can be carried out in gas phase.

The reaction temperature in the polymerization stage for the preparation of the polymer component (a) and in the preparation of the elastomeric copolymer component (b) may be the same or different, and may be in a range from 40 to 100° C.; from 50 to 90° C. in the preparation of polymer component (a), and from 70 to 100° C. for the preparation of copolymer component (b).

The pressure of the polymerization stage used to prepare polymer component (a), if carried out in a liquid monomer, is the one which competes with the vapor pressure of the liquid propylene at the operating temperature used, and it may be modified by manipulating the vapor pressure of the small quantity of inert diluent used to feed the catalyst mixture, by the overpressurizing of optional monomers and by the use of hydrogen as a molecular weight regulator.

The polymerization pressure ranges, in certain embodiments, from 33 to 43 bar, if done in liquid phase, and from 5 to 30 bar if done in gas phase. The residence times relative to the stages depend on the desired ratio between polymer components (a) and (b), and may range from 15 minutes to 8 hours. Conventional molecular weight regulators known in the art, such as chain transfer agents (e.g., hydrogen or $ZnEt_2$), may be used.

The compositions of the present dislcosure can also be obtained by separately preparing separately components (a)

and (b), by operating with the same catalysts at substantially under the same polymerization conditions as described above (except that a wholly sequential polymerization process will not be carried out, but the components will be prepared in separate polymerization steps) and then mechanically blending the components in a molten or a softened state. Conventional mixing apparatuses, like screw extruders, including twin screw extruders, can be used.

All the polymerization stages may be carried out in the presence of a catalyst comprising a trialkylaluminum compound, optionally comprising an electron donor, and a solid catalyst component comprising a halide or halogen-alcoholate of Ti and an electron-donor compound supported on anhydrous magnesium chloride. Catalysts having the above mentioned characteristics are well known in the patent literatureand include the catalysts described in U.S. Pat. No. 4,399,054 and EP Pat. Doc. No. EP-A-45977. Other examples can be found in U.S. Pat. No. 4,472,524.

In some embodiments, the polymerization catalyst is a stereospecific Ziegler-Natta catalyst comprising a solid catalyst component comprising:
(i) Mg, Ti and halogen and an electron donor (internal donor);
(ii) an alkylaluminum compound and, optionally;
(iii) one or more electron-donor compounds (external donor).

The internal donor may be selected from the esters of mono- or dicarboxylic organic acids such as benzoates, malonates, phthalates and certain succinates. They are described, for example, in U.S. Pat. No. 4,522,930, EP Pat Doc. No. 45977 and WIPO Pat. App. Nos. WO 00/63261 and WO 01/57099. Phthalic acid esters and succinate acids esters, phthalic acid esters, alkylphthalates such as diisobutyl, dioctyl and diphenyl phthalate and benzyl-butyl phthalate may be used.

In some embodiments, internal donors include succinate-type compounds of formula (I) below:

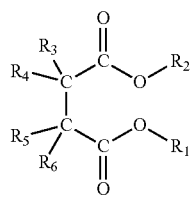

(I)

wherein the radicals $R_1$ and $R_2$, equal to, or different from, each other, are a $C_1$-$C_{20}$ linear or branched alkyl, alkenyl, cycloalkyl, aryl, arylalkyl or alkylaryl group, optionally containing heteroatoms; the radicals $R_3$ to $R_6$, equal to, or different from, each other, are hydrogen or a $C_1$-$C_{20}$ linear or branched alkyl, alkenyl, cycloalkyl, aryl, arylalkyl or alkylaryl group, optionally containing heteroatoms, and any two $R_3$ to $R_6$ radicals can be linked together to form a cycle.

In some embodiments, the Al-alkyl compounds used as co-catalysts comprise Al-trialkyls, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups. The Al-alkyl compound is generally used in such a quantity that the Al/Ti ratio is from 1 to 1000.

The external donor can be of the same type or it can be different from the succinates of formula (I). Suitable external electron-donor compounds include silicon compounds, ethers, esters such as phthalates, benzoates, succinates also having a different structure from those of formula (I), amines, heterocyclic compounds and particularly 2,2,6,6-tetramethylpiperidine, ketones and the 1,3-diethers of the general formula (II):

(II)

wherein RI and RII are the same or different and are $C_1$-$C_{18}$ alkyl, $C_3$-$C_{18}$ cycloalkyl or $C_7$-$C_{18}$ aryl radicals; RIII and RIV are the same or different and are C1-C4 alkyl radicals; or the 1,3-diethers in which the carbon atom in position 2 belongs to a cyclic or polycyclic structure made up of 5, 6 or 7 carbon atoms and containing two or three sites of unsaturation.

Ethers of this type are described in European Patent Application Nos. 361493 and 728769.

In some embodiments, electron-donor compounds that can be used as external donors include aromatic silicon compounds containing at least one Si—OR bond, where R is a hydrocarbon radical. In certain embodiments, silicon compounds of the formula Ra7Rb8Si(OR9)c, where a and b are integer from 0 to 2, c is an integer from 1 to 3 and the sum (a+b+c) is 4; R7, R8, and R9, are $C_1$-$C_{18}$ hydrocarbon groups optionally containing heteroatoms, may be used, as well as silicon compounds in which a is 1, b is 1, c is 2, at least one of R7 and R8 is selected from branched alkyl, alkenyl, alkylene, cycloalkyl or aryl groups with 3-10 carbon atoms optionally containing heteroatoms and R9 is a $C_1$-$C_{10}$ alkyl group, such as a methyl group. Examples of silicon compounds for use in the present technology are cyclohexyltrimethoxysilane, t-butyltrimethoxysilane, t-hexyltrimethoxysilane, cyclohexylmethyldimethoxysilane, 3,3,3-trifluoropropyl-2-ethylpiperidyl-dimethoxysilane, diphenyldimethoxysilane, methyl-t-butyldimethoxysilane, dicyclopentyldimethoxysilane, 2-ethylpiperidinyl-2-t-butyldimethoxysilane, (1,1,1-trifluoro-2-propyl)-methyldimethoxysilane and (1,1,1-trifluoro-2-propyl)-2-ethylpiperidinyldimethoxysilane. Moreover, silicon compounds in which a is 0, c is 3, R8 is a branched alkyl or cycloalkyl group, optionally containing heteroatoms, and R9 is methyl may be used, including (tert-butyl)2Si(OCH3)2, (cyclohexyl) (methyl) Si(OCH3)2, (phenyl)2Si(OCH3)2, (cyclopentyl) 2Si(OCH3)2, and diiso-propyl dimethoxi silane.

In some embodiments, the external electron donor compound is used in such an amount to give a molar ratio between the organoaluminum compound and the electron donor compound of from 0.1 to 500, including from 1 to 300 and from 3 to 30.

In some embodiments, the solid catalyst component comprises, in addition to the above electron donors, Ti, Mg and halogen. In further embodiments, the catalyst component comprises a titanium compound having at least a Ti-halogen bond and the electron donor compounds described herein supported on a Mg halide. The magnesium halide, in certain embodiments, is $MgCl_2$ in active form, which is widely known from the patent literature as a support for Ziegler-Natta catalysts. U.S. Pat. Nos. 4,298,718 and 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line in the spectrum of the non-active halide is diminished in intensity and is replaced by a halo whose maximum intensity is displaced towards lower angles relative to that of the more intense line.

Titanium compounds for use in the present technology include $TiCl_4$ and $TiCl_3$. Ti-haloalcoholates of the formula Ti(OR)n-yXy can also be used, where n is the valence of titanium, y is a number between 1 and n, X is halogen and R is a hydrocarbon radical having from 1 to 10 carbon atoms.

The preparation of the solid catalyst component can be carried out according to methods known in the art.

According to one method, the solid catalyst component can be prepared by reacting a titanium compound of formula $Ti(OR)_{n-y}X_y$, where n is the valence of titanium and y is a number between 1 and n, including $TiCl_4$, with a magnesium chloride deriving from an adduct of formula $MgCl_2 \cdot pROH$, where p is a number between 0.1 and 6, including from 2 to 3.5, and R is a hydrocarbon radical having 1-18 carbon atoms. The adduct can be prepared in spherical form by mixing alcohol and magnesium chloride in the presence of an inert hydrocarbon immiscible with the adduct under stirring conditions at the melting temperature of the adduct (100-130° C.). The emulsion is quickly quenched, causing the solidification of the adduct in form of spherical particles.

Examples of spherical adducts prepared according to this procedure are described in U.S. Pat. Nos. 4,399,054 and 4,469,648. The resulting adducts can be directly reacted with the Ti compound or subjected to thermally controlled dealcoholation (80-130° C.) to obtain an adduct in which the number of moles of alcohol is generally lower than 3, including between 0.1 and 2.5. The reaction with the Ti compound can be carried out by suspending the adduct (dealcoholated or not) in cold $TiCl_4$ (generally around 0° C.). The mixture is heated up to 80-130° C. for 0.5-2 hours. The treatment with $TiCl_4$ can be carried out one or more times. The electron donor compound(s) can be added during the treatment with $TiCl_4$.

Regardless of the preparation method used, the final amount of the electron donor compound(s) is, in certain embodiments, such that the molar ratio with respect to the $MgCl_2$ is from 0.01 to 1, such as from 0.05 to 0.5.

Catalyst components and catalysts for use in the present technology are described in WIPO Pat. App. Pub. Nos. WO 00/63261 and 01/57099.

In additional embodiments, the catalysts may be precontacted with small quantities of olefin (prepolymerization), maintaining the catalyst in suspension in a hydrocarbon solvent and polymerizing at temperatures from ambient temperature to 60° C. for producing a quantity of polymer from 0.5 to 3 times the weight of the catalyst. The process can also take place in a liquid monomer, producing, in certain embodiments, a quantity of polymer 1000 times the weight of the catalyst.

By using the catalysts described herein, the polyolefin compositions may be obtained in spheroidal particle form, the particles having an average diameter from about 250 to 7,000 μm, a flowability of less than 30 seconds and a bulk density (compacted) of greater than 0.4 g/ml.

Besides the clarifying agent, the compositions of the present disclosure can contain other additives employed in the art, such as antioxidants, light stabilizers, heat stabilizers, colorants and fillers.

The addition of inorganic fillers, such as talc, calcium carbonate and mineral fibers, may bring about an improvement to some mechanical properties, such as flexural modulus and heat deflection temperature (HDT).

The compositions of the present disclosure can be used to prepare sheets endowed with a good balance of stiffness and impact resistance as well as a good transparency.

In some embodiments, the present disclosure provides for a sheet obtained from a propylene polymer composition comprising:
  (a) 78-85%, such as 80-83%, by weight of a propylene homopolymer or a copolymer of propylene with ethylene, having an ethylene content of up to 2.0% by weight;
  (b) 15-22%, including 17-20%, by weight of a copolymer of ethylene with propylene, having an ethylene content of from 78-90% by weight; and
  (c) an effective amount of a clarifying agent;
  wherein the composition has an intrinsic viscosity of the xylene soluble fraction (XSIV) at room temperature of from 0.5 to 1.5 dl/g and a melt flow rate (MFR), measured at 230° C. and 2.16 kg, of from 0.5 to 10 g/10 min.

The resulting sheets, due to their good balance of properties, are suitable for the production of thermoforming articles.

According to a further object the present disclosure, a thermoformed article obtained from a propylene polymer composition comprising:
  (a) 78-85%, including 80-83%, by weight of a propylene homopolymer or a copolymer of propylene with ethylene, having an ethylene content of up to 2.0% by weight;
  (b) 15-22%, such as 17-20%, by weight of a copolymer of ethylene with propylene, having an ethylene content of from 78-90% by weight; and
  (c) an effective amount of a clarifying agent;
  wherein the composition has an intrinsic viscosity of the xylene soluble fraction (XSIV) at room temperature of from 0.5 to 1.5 dl/g and a melt flow rate (MFR), measured at 230° C. and 2.16 kg, of from 0.5 to 10 g/10 min may be produced.

BRIEF DESCRIPTION OF THE DRAWINGS

FIG. 1 shows a small angle X-ray scattering (SAXS) profile for the sheet prepared in Example 3.

FIG. 2 shows a SAXS profile for the sheet prepared in Example 10C.

The following examples are given to illustrate the present disclosure without unduly limiting its breadth or scope.

Methods

Ethylene Content

The content of ethylene comonomer was determined by infrared spectroscopy (IR) by collecting the IR spectrum of the sample versus an air background with a Fourier Transform Infrared (FTIR) spectrometer. The instrument data acquisition parameters are:
  purge time: 30 seconds minimum
  collect time: 3 minutes minimum
  apodization: Happ-Genzel
  resolution: 2 $cm^{-1}$.

Sample Preparation—Using a hydraulic press, a thick sheet is obtained by pressing about 1 g of sample between two aluminum foils. A small portion is cut from this sheet to mold a film. Recommended film thickness ranges between 0.02 and 0.05 cm (8-20 mils). The pressing temperature is 180±10° C. (356° F.) and about 10 kg/cm² (142.2 PSI) pressure for about one minute. After the pressure is released, the sample is removed from the press and cooled to room temperature.

The spectrum of pressed film sample is recorded in absorbance versus wavenumbers (cm⁻¹). The following measurements are used to calculate ethylene content:

Area ($A_t$) of the combination absorption bands between 4482 and 3950 cm⁻¹, which is used for spectrometric normalization of the film thickness;

Area ($A_{C2}$) of the absorption band between 750 and 700 cm⁻¹ after a spectroscopic subtraction of a reference spectrum of an isotactic non-additivated polypropylene in the range 800-690 cm⁻¹;

In order to calculate the ethylene content, a calibration straight line for ethylene obtained by using samples of known amount of ethylene is needed and is obtained by plotting $A_C^2/A_t$ versus ethylene molar percent (%C2m). The slope $G_{C2}$ is calculated from a linear regression.

The spectra of the unknown samples are recorded and then ($A_t$) and ($A_{C2}$) of the unknown sample are calculated. The ethylene content by weight is obtained using ethylene content (% molar fraction C2m) of the sample, which is calculated as follows:

$$\%C2m = \frac{1}{G_{C2}} \cdot \frac{A_{C2}}{A_t}$$

The ethylene content of component (a) is determined on a propylene copolymer sample taken out from the first reactor.

The ethylene content of component (b) is determined on the precipitated "amorphous" fraction of the polymer. The precipitated "amorphous" fraction is obtained as follows: to one 100 ml aliquot of the filtered liquid obtained as described below in the paragraph headed "Intrinsic viscosity of the xylene-soluble fraction", 200 ml of acetone are added under vigorous stirring. Precipitation is completed and evidenced by a clear, solid-solution separation. The resulting solid is filtered on a metallic screen and dried in a vacuum oven at 70° C. until a constant weight is reached. Since the portion of (b) with very high ethylene content crystallizes and is excluded from the xylene-soluble fraction, a correction was made to the ethylene content of the "amorphous" fraction by using the following equation obtained from the data of ethylene copolymers with propylene polymerized in an autoclave by using the same catalyst systems:

(ethylene content of component (b))=1.37×(ethylene content of "amorphous" fraction)−5.7

The equation is valid when the "amorphous" ethylene content is between 55% and 70% by weight (the ethylene content of (b) is between 70% and 90% by weight).

Intrinsic Viscosity of the Xylene-Soluble Fraction (XSIV)

2.5 g of polymer and 250 ml of xylene were introduced in a glass flask equipped with a refrigerator and a magnetic stirrer. The temperature is raised over 30 minutes up to the boiling point of the solvent. The resulting clear solution is then kept under reflux and stirring for 30 minutes. The closed flask is then kept in thermostatic water bath at 25° C. for 30 minutes. The resulting solid is filtered on quick filtering paper. A 100 ml aliquot of the filtered liquid was poured in an aluminium container and heated on a heating plate under nitrogen flow to remove the solvent by evaporation. The sample for measurement was removed from the container after cooling for 30 minutes at room temperature. The intrinsic viscosity was determined in tetrahydronaphthalene at 135° C.

Melt Flow Rate (MFR)

Determined according to ISO 1133 (230° C., 2.16 Kg).

Taber Stiffness

Determined according to ASTM D747.

Dart Impact

Determined according to ISO 7765-1.

Haze

Determined according to ISO 14782. Liquid Paraffin (KANTO CHEMICAL CO., INC., Catalog No. 32033-00) was painted with a brush on both sides of the sheet surface. Haze value was measured with a HM-150 (Murakami Color Research Laboratory) instrument.

Whiteness Index (WI)

Determined according to ASTM E313. Liquid Paraffin (KANTO CHEMICAL CO., INC., Catalog No. 32033-00) was painted with a brush on both sides of the sheet surface. Whiteness Index was measured by the reflection method with a SE-2000 (Nippon Denshoku Co., Ltd.) instrument after putting a slide glass on the front surface and a black glass (BK-7, Murakami Color Research Laboratory) on the back surface.

Draw-Down Time

A sheet attached to a metal frame of 100×150 mm was introduced into an oven kept at 210° C. Draw-Down Time is defined as T2−T1, wherein T1 is the time required for the sheet to stretch back and T2 the time required for a 2 cm sag in the center of the sheet due to its own weight after the stretch back.

Small Angle X-Ray Scattering (SAXS)

PE crystals in component (b) were detected as streak scattering, inclined 45° to machine direction (MD), in a Small Angle X-ray Scattering (SAXS) profile of the sheet. SAXS was measured at 0.1 nm of wave length, 2.3 m of camera length, and 200 msec of exposure time by using a detector system of image intensifier (II) and charge coupled device (CCD) in the BL03XU beamline of SPring-8, a synchrotron radiation facility located in Hyōgo Prefecture, Japan and run by the Japan Synchrotron Radiation Research Institute.

EXAMPLES

A series of polymerization runs were carried out in a plant operating continuously in a series of a first liquid-phase reactor and a second fluidized bed gas-phase reactor, equipped with devices to transfer the product from the first reactor to the second reactor.

Examples 1-7 and Comparative Examples 10C-12C

Preparation of the Catalyst and Pre-Polymerization

A Ziegler-Natta catalyst component was prepared according to Example 5, lines 48-55 of European Patent No. EP728769. The catalyst component was contacted at 12° C. for 24 minutes with aluminum triethyl (TEAL) and dicyclopentyldimethoxysilane (DCPMS) as an external electron-donor component. The weight ratio between TEAL and the solid catalyst component was 11 and the weight ratio between TEAL and DCPMS was 10. The catalyst system was subjected to pre-polymerization by maintaining it in a suspension in liquid propylene at 20° C. for about 5 minutes before introducing it into the first polymerization reactor.

Polymerization

A propylene homopolymer as component (a) was prepared in the first reactor, while an ethylene-propylene copolymer as component (b) was prepared in the second reactor. Constant temperature and pressure were maintained throughout the course of the reaction. Hydrogen was used as molecular weight regulator. The composition of the gas phase (propylene, ethylene and hydrogen) was continuously determined by gas-chromatography analysis. At the end of the run the powder is discharged and dried under a nitrogen flow. Data on the characterization of the obtained polymers are shown in Table 1. The polymer characterization data are obtained from measurements carried out on the resulting polymers, which may be stabilized when necessary.

Extrusion

The polymer particles were mixed with the quantities and type of clarifying agent indicated in Table 1 and with 0.1 phr of Irganox B225, a stabilizer commercialized by Ciba. "NX8000" stands for Millad® NX8000 (commercially available from Milliken Chemicals). "NA71" stands for ADK NA-71 (commercially available from Amfine Chemicals). The polymer particles were then introduced in an extruder and extruded under nitrogen atmosphere in a twin screw extruder at a rotation speed of 220 rpm and a melt temperature of 200-250° C. The resulting pellets were used to prepare a sheet of 0.3 mm in thickness by operating at 220° C. of extrusion temperature, 50° C. of measured chilled roll temperature, and 1.1 m/min of take-up velocity by using a sheet extruder of 40 φ for single layer (Tanabe). The sheet specimen was used for all the tests for physical properties. Data relating to the physical-mechanical properties of the final polymer compositions, obtained from measurements carried out on the extruded polymers, are reported in Table 2. The SAXS profile for the sheet prepared in Example 3 is shown in FIG. 1. The SAXS profile for the sheet prepared in Example 10C is shown in FIG. 2.

Examples 8-9 and Comparative Examples 13C-17C

The procedure described for Examples 1-7 and 10C-12C was repeated with the difference that the Ziegler-Natta catalyst was prepared according to Example 1 of WIPO Pat. App. Pub. No. WO 2009/050045 except that, for the first temperature increase, the temperature was raised to 110° C. instead of 100° C. Data on the characterization of the obtained polymers are shown in Table 1. Data relating to the physical-mechanical properties of the final polymer compositions, obtained from measurements carried out on the extruded polymers, are reported in Table 2.

TABLE 1

| EXAMPLE | 1 | 2 | 3 | 4 | 5 | 6 | 7 | 8 | 9 | 10C | 11C | 12C | 13C | 14C | 15C | 16C | 17C |
|---|---|---|---|---|---|---|---|---|---|---|---|---|---|---|---|---|---|
| C2 in (a) [wt %] | 0 | 1.0 | 1.9 | 0 | 1.0 | 1.0 | 1.0 | 1.9 | 1.9 | 1.9 | 1.9 | 1.9 | 1.5 | 3.0 | 0 | 1.0 | 1.9 |
| C2 in (b) [wt %] | 80 | 80 | 80 | 78 | 78 | 85 | 80 | 79 | 79 | 73 | 72 | 75 | 73 | 79 | 79 | 79 | 79 |
| XSIV [dl/g] | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Content of (b) [wt %] | 20 | 20 | 20 | 20 | 20 | 20 | 20 | 20 | 15 | 20 | 20 | 20 | 10 | 10 | 10 | 10 | 10 |
| MFR of composition [g/10 min] | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| NX8000 (clarifier) [phr] | 0.4 | 0.4 | 0.4 | 0.4 | 0.4 | 0.4 | 0 | 0.4 | 0.4 | 0.4 | 0.4 | 0.4 | 0.4 | 0.4 | 0.4 | 0.4 | 0.4 |
| NA71 (clarifier) [phr] | 0 | 0 | 0 | 0 | 0 | 0 | 0.25 | 0 | 0 | 0 | 0 | 0 | 0 | 0 | 0 | 0 | 0 |

TABLE 2

| EXAMPLE | 1 | 2 | 3 | 4 | 5 | 6 | 7 | 8 | 9 | 10C | 11C | 12C | 13C | 14C | 15C | 16C | 17C |
|---|---|---|---|---|---|---|---|---|---|---|---|---|---|---|---|---|---|
| Taber Stiffness [MPa] | 1150 | 830 | 620 | 1090 | 810 | 850 | 930 | 620 | 710 | 600 | 610 | 620 | 830 | 570 | 1100 | 950 | 780 |
| Dart Impact (23° C.) [J] | 4.3 | 4.2 | 5.1 | 4.1 | 5.0 | 4.5 | 4.1 | 5.1 | 4.1 | 5.3 | 5.0 | 4.7 | 2.9 | 5.3 | 4.1 | 1.8 | 2.0 |
| Dart Impact (0° C.) [J] | 3.5 | 3.5 | 4.0 | 4.1 | 3.3 | 3.1 | 3.7 | 3.6 | 4.0 | 4.3 | 3.6 | 4.0 | 1.2 | 3.9 | 1.6 | 2.3 | 1.1 |
| Dart Impact (−20° C.) [J] | 1.7 | 1.4 | 2.0 | 1.4 | 1.6 | 1.3 | 1.3 | 2.0 | 2.4 | 2.3 | 2.0 | 1.9 | 0.8 | 2.3 | <0.78 | <0.78 | <0.78 |
| Haze [%] | 2.2 | 2.0 | 3.8 | 3.9 | 3.7 | 3.7 | 3.9 | 3.8 | 3.5 | 4.8 | 4.6 | 4.0 | 3.6 | 3.7 | 3.5 | 2.3 | 2.6 |
| WI | 1.5 | 1.7 | 1.9 | 1.7 | 1.7 | 1.9 | 1.9 | 1.4 | 1.3 | 5.2 | 4.3 | 2.7 | 2.1 | 1.8 | 1.7 | 1.6 | 1.8 |
| Draw-Down Time [sec] | 59 | 58 | 50 | 51 | 62 | 56 | 67 | 71 | 73 | 56 | 61 | 57 | 65 | 67 | 69 | 72 | 70 |
| SAXS | Y | Y | Y | Y | Y | Y | Y | Y | Y | N | N | Y | N | Y | Y | Y | Y |

Y = existence of PE crystals in component (b)
N = absence of PE crystals in component (b)

What is claimed is:

1. A polypropylene composition comprising:
   (a) 78-85% by weight of a propylene homopolymer or of a copolymer of propylene comprising an ethylene content of up to 2.0% by weight;
   (b) 15-22% by weight of a copolymer of ethylene with propylene comprising an ethylene content of 78-90% by weight; and
   (c) 0.4-1% by weight of a clarifying agent;
   wherein the composition has an intrinsic viscosity of the xylene soluble fraction (XSIV) at room temperature of 0.5-1.5 dl/g and a melt flow rate (MFR, 230° C., 2.16 kg) of 0.5-10 g/10 min.

2. The propylene polymer composition of claim 1, wherein the clarifying agent is selected among sorbitol derivatives, nonitol derivatives and phosphate derivatives.

3. The propylene polymer composition of claim 2, wherein the clarifying agent is selected from 1,3:2,4-bis-(3,4-dimethylbenzylidene) sorbitol and 1,2,3-trideoxy-4,6:5,7-bis-O-[(4-propylphenyl)methylene]-nonitol.

4. A process for the preparation of the polyolefin composition of claim 1, comprising at least two sequential polymerization stages, with each subsequent polymerization being conducted in the presence of the polymeric material formed in the immediately preceding polymerization reaction, wherein the polymerization stage of propylene to the polymer component (a) is carried out in at least one stage, and at least one copolymerization stage of mixtures of ethylene with propylene to the elastomeric polymer component (b) is carried out.

5. The process of claim 4, wherein the polymerization stages are carried out in the presence of a stereospecific Ziegler-Natta catalyst.

6. The process of claim 4, wherein the stereospecific Ziegler-Natta catalyst comprises:
   (i) Mg, Ti, a halogen and an internal electron donor;
   (ii) an alkylaluminum compound and, optionally;
   (iii) one or more external electron-donor compounds (external donor).

7. The process of claim 4, wherein the polymerization of the polymer component (a) is carried out in liquid monomer, while the copolymerization stages of the elastomeric copolymer component (b) is carried out in gas phase.

8. A sheet comprising the propylene polymer composition of claim 1.

9. A thermoformed article comprising the propylene polymer composition of claim 1.

* * * * *

UNITED STATES PATENT AND TRADEMARK OFFICE
CERTIFICATE OF CORRECTION

PATENT NO. : 9,982,120 B2
APPLICATION NO. : 15/117320
DATED : May 29, 2018
INVENTOR(S) : Nakajima et al.

Page 1 of 1

It is certified that error appears in the above-identified patent and that said Letters Patent is hereby corrected as shown below:

In the Specification

In Column 2, Line 66, delete "dislcosure" and insert -- disclosure --.
In Column 3, Line 16, delete "literatureand" and insert -- literature and --.
In Column 4, Line 52, delete "dimethoxi" and insert -- dimethoxy --.

In the Claims

In Column 11, Claim 1, Line 3, after "or" delete "of".

Signed and Sealed this
First Day of February, 2022

Drew Hirshfeld
*Performing the Functions and Duties of the*
*Under Secretary of Commerce for Intellectual Property and*
*Director of the United States Patent and Trademark Office*